(12) United States Patent
Ökvist (10) Patent No.: US 11,418,250 B2
(45) Date of Patent: Aug. 16, 2022

(54) PASSIVE MODULE FOR A HOLDING STRUCTURE, AND SUCH A HOLDING STRUCTURE

(71) Applicant: Telefonaktiebolaget LM Ericsson (publ), Stockholm (SE)

(72) Inventor: Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 16/647,879

(22) PCT Filed: Nov. 8, 2017

(86) PCT No.: PCT/SE2017/051111
§ 371 (c)(1),
(2) Date: Mar. 17, 2020

(87) PCT Pub. No.: WO2019/093933
PCT Pub. Date: May 16, 2019

(65) Prior Publication Data
US 2020/0220610 A1 Jul. 9, 2020

(51) Int. Cl.
*H04B 7/14* (2006.01)
*H04B 7/145* (2006.01)
*B60R 11/00* (2006.01)
*E06B 7/28* (2006.01)

(52) U.S. Cl.
CPC .............. *H04B 7/145* (2013.01); *B60R 11/00* (2013.01); *E06B 7/28* (2013.01); *B60R 2011/0003* (2013.01)

(58) Field of Classification Search
CPC ........... H04B 7/145; H04B 1/38; B60R 11/00; B60R 2011/0003; E06B 7/28

USPC .............................................................. 455/7
See application file for complete search history.

(56) References Cited

U.S. PATENT DOCUMENTS

2004/0113860 A1* 6/2004 Walton ................. H01Q 1/1271
 343/872
2005/0168392 A1* 8/2005 Hagiwara .............. H01Q 21/29
 343/773

FOREIGN PATENT DOCUMENTS

DE 102011050469 A1 11/2012
EP 2452399 A1 5/2012
EP 3183774 A1 6/2017
(Continued)

OTHER PUBLICATIONS

Extended European Search Report for European Patent Application No. 17931237.6, dated May 26, 2021, 7 pages.
(Continued)

*Primary Examiner* — Shaima Q Aminzay
(74) *Attorney, Agent, or Firm* — Sage Patent Group (57) ABSTRACT

There is provided a passive module for a holding structure. The holding structure is adjacent or part of a movable wing. The passive module comprises a support structure. The passive module comprises a radio transmission regulating structure. The radio transmission regulating structure is supported by the support structure. The radio transmission regulating structure has a radio transmission regulating characteristics. There is also provided a holding structure. The holding structure exhibits a slot for receiving such a passive module. There is further provided a kit of parts comprising at least one such passive module and such a holding structure.

20 Claims, 5 Drawing Sheets

(56) References Cited

FOREIGN PATENT DOCUMENTS

WO 2014145144 A2 9/2014
WO 2016104804 A1 6/2016

OTHER PUBLICATIONS

Baniya, Anil, Master of Science Thesis, Radio Frequency Electronics, "Assessment of Frequency Selective Surface for Improving Indoor Cellular Coverage", XP055407337, Tampere University of Technology, Feb. 5, 2014, 82 pages.
PCT International Search Report and Written Opinion dated Jul. 11, 2018 for International Application No. PCT/SE2017/051111, 9 pages.

* cited by examiner

Section A1-A1'

PASSIVE MODULE FOR A HOLDING STRUCTURE, AND SUCH A HOLDING STRUCTURE

CROSS-REFERENCE TO RELATED APPLICATIONS

This application is a 35 U.S.C § 371 national stage application for International Application No. PCT/SE2017/051111, entitled "PASSIVE MODULE FOR A HOLDING STRUCTURE, AND SUCH A HOLDING STRUCTURE", filed on Nov. 8, 2017, the disclosures and contents of which are hereby incorporated by reference in their entireties.

TECHNICAL FIELD

Embodiments presented herein relate to a passive module for a holding structure, where the passive module comprises a radio transmission regulating structure. Embodiments presented herein further relate to a holding structure for the passive module.

BACKGROUND

The possibility to provide radio network coverage and access in outdoor to indoor radio transmission scenarios as well as indoor to outdoor radio transmission scenarios is an important characteristic for proper planning, optimization and utilization of radio networks. Outer wall penetration loss of radio waves is a key parameter for outdoor to indoor radio network coverage as well as for indoor to outdoor radio network access. Further, for certain radio network deployment strategies the design of the in-building radio network coverage will depend on to what extent the building façade is considered as radio-wise isolated towards the surrounding outdoor radio network.

In scenarios with high outer wall penetration loss (as with building walls and windows having characteristics, such as in buildings with reflective thermal insulation and/or low-emissivity windows, resulting in radio transmission isolation), sufficient indoor network coverage and access might be challenging to accomplish using outdoor radio access network nodes. A specific design of an indoor radio network might be required to provide sufficient indoor network coverage and access.

On the other hand, in scenarios where building walls provide little, or no, radio transmission isolation, it is might be required to consider how to coordinate indoor radio networks with outdoor radio networks as overlapping radio networks might cause mutual interference. Further, it might be so that there are two or more indoor radio networks that need coordination so as to avoid mutual interference.

In either scenario, there is a continuous evolution of radio networks to facilitate increasing end-user service demands and the corresponding traffic growth. In this context, buildings could be considered as static monolithic structures constructed at a given point in time, not likely experiencing any significant structural upgraded or renovation within at least the first 10-20 years. During that time, radio networks are likely to evolve by means of upgrades or densifications, and/or shift in radio access technology.

Generally, the increasing use of reflective thermal insulation and/or low-emissivity windows in buildings decreases the outdoor to indoor radio network coverage as well as the indoor to outdoor radio network access, especially radio waves of those wavelengths considered for the emerging so-called fifth generation mobile communications systems (5G). It is therefore foreseen that it will be increasingly challenging to provide radio network cover in indoor locations using outdoor radio networks.

Low-emissivity windows are commonly provided with a thin film coating in order to improve the thermal control (such as insulation and solar optical properties). In this respect, it might thus be possible to increase the outdoor to indoor radio network coverage as well as the indoor to outdoor radio network access and indoor to indoor network coverage and access by engraving a radio-wise transparent passage in the film coating. Such engravings thus leave permanent markings on the window. Additionally, it might be cumbersome to engrave a radio-wise transparent passage in windows already installed in buildings.

Hence, there is still a need for an improved control of outdoor to indoor radio network coverage as well as indoor to outdoor radio network access and indoor to indoor network coverage and access.

SUMMARY

An object of embodiments herein is to enable efficient control of outdoor to indoor radio network coverage as well as indoor to outdoor radio network access and indoor to indoor network coverage and access.

According to a first aspect there is presented a passive module for a holding structure. The holding structure is adjacent or part of a movable wing. The passive module comprises a support structure. The passive module comprises a radio transmission regulating structure. The radio transmission regulating structure is supported by the support structure. The radio transmission regulating structure has a radio transmission regulating characteristics.

According to a second aspect there is presented a holding structure. The holding structure is adjacent or part of a movable wing. The holding structure exhibits a slot for receiving a passive module according to the first aspect.

According to a third aspect there is presented a kit of parts. The kit of parts comprises comprising at least one passive module according to the first aspect and a holding structure according to the second aspect.

Advantageously this passive module, this holding structure, and this kit of parts enable efficient control of outdoor to indoor radio network coverage as well as indoor to outdoor radio network access and indoor to indoor network coverage and access.

Advantageously this passive module, this holding structure, and this kit of parts allows quick and easy replacement of one passive module with a given radio transmission regulating characteristics (such as, enabling radio transmission) with another passive module with another given radio transmission regulating characteristics (such as, preventing radio transmission), should the needs for outdoor to indoor radio network coverage as well as indoor to outdoor radio network access change.

Advantageously this passive module, this holding structure, and this kit of parts provide a modular system for controlling outdoor to indoor radio network coverage as well as indoor to outdoor radio network access and indoor to indoor network coverage and access.

Advantageously this passive module, this holding structure, and this kit of parts are easy to install for windows, doors, etc. during manufacturing of the same.

Advantageously this passive module, this holding structure, and this kit of parts do not leave any permanent markings except the slot needed to be provided in the holding structure for receiving the passive module.

Advantageously this passive module, this holding structure, and this kit of parts do not leave any markings on the windows.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, and 8 illustrate embodiments of a passive module.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above there is still a need for an improved control of outdoor to indoor radio network coverage as well as indoor to outdoor radio network access and indoor to indoor network coverage and access. The embodiments disclosed herein therefore relate to a passive module and a holding structure for receiving and accommodating such a passive module. As will be further disclosed below, the passive module has a radio transmission regulating structure with a given radio transmission regulating characteristics. It is thereby possible to exchange one passive module having a given radio transmission regulating characteristics with another passive module having another given radio transmission regulating characteristics should the outdoor to indoor radio network coverage as well as indoor to outdoor radio network access, thereby enabling control of the outdoor to indoor radio network coverage as well as indoor to outdoor radio network access.

FIGS. 1, 2, 3, 4 and 8 illustrate embodiments of a holding structure 200.

Figure 1:
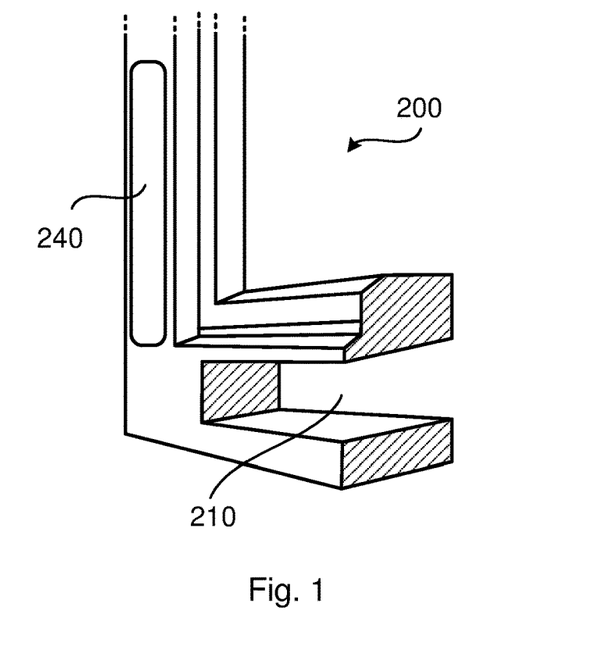
FIGS. 1, 2, 3, 4, and 8 illustrate embodiments of a holding structure.

FIG. 1 is a perspective view, partly as an exploded view, of a holding structure 200. The holding structure 200 is adjacent or part of a movable wing. The holding structure 200 exhibits a slot 210 for receiving a passive module 300 (not shown in FIG. 1). Properties of the passive module will be disclosed below.

Embodiments relating to further details of the holding structure 200 will now be disclosed.

There may be different ways to provide the holding structure 200. Particularly, according to an embodiment the holding structure 200 is a window reveal, a window casing, a window frame, a door jamb, a door, a roof, or an A-, B-, C-, or D-pillar of a vehicle. Thus, the movable wing could be a window frame or a door.

There may be different ways to provide the slot 210. In some aspects the slot 210 is vertically arranged and in other aspects the slot 210 is horizontally arranged. In general terms, where to provide the slot 210 and how to arrange the slot 210 (vertically or horizontally) depends on the shape and orientation of the holding structure 300. The passive module 200 might thereby be arranged to comply with horizontal as well as vertical radio wave polarizations depending on the orientation of the passive module 200, where one polarization direction is handled by a vertically arranged passive module 200 (when fitted in the slot covered by cover 240 in FIG. 1) and another polarization direction is handled by a horizontally arranged passive module 200 (when fitted in the empty slot 210 in FIG. 1).

Further, there could be different shapes of the slot 210 so as to receive and accommodate the passive module 300. In general terms, the slot 210 has a shape that provides a snug fit of the passive module 300. Different shapes of the slot 210 will be disclosed with reference to FIGS. 5 and 8.

Figure 2:
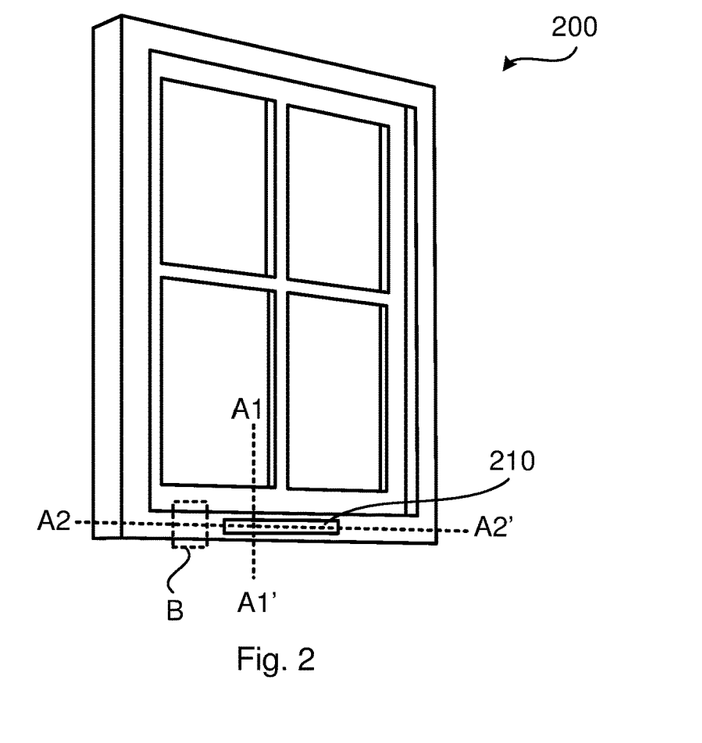

FIG. 2 is a perspective view schematically illustrating a holding structure 200 adjacent or part of a window frame or window reveal. FIG. 2 further shows the position of section B illustrated in FIG. 3 as well as lines A1-A1' and A2-A2' defining the positions for the cross sections illustrated in FIGS. 4, and 5.

Figure 3:
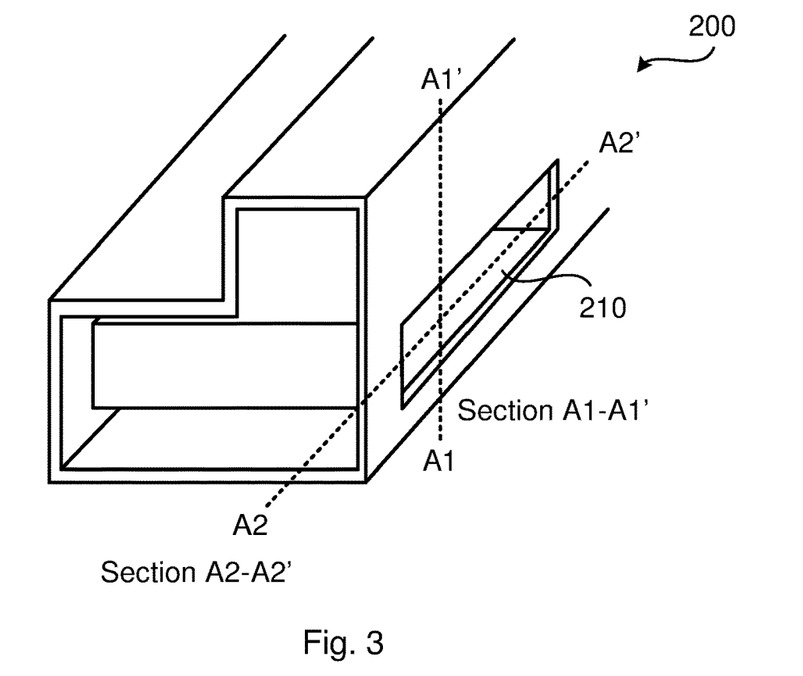

FIG. 3 is a perspective view, partly as an exploded view, schematically illustrating section B of the holding structure 200 of FIG. 2. FIG. 3 further shows lines A1-A1' and A2-A2' defining the positions for the cross sections illustrated in FIGS. 4, and 5.

Figure 4:
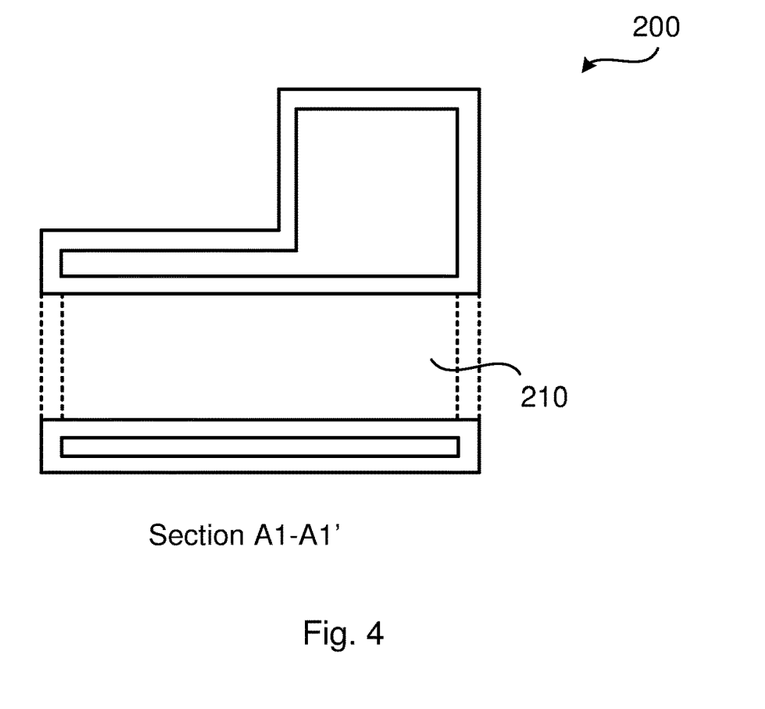

FIG. 4 illustrates a side view of a section of the holding structure 200 of FIGS. 2 and 3 taken along the cut A1-A1'.

Figure 5:
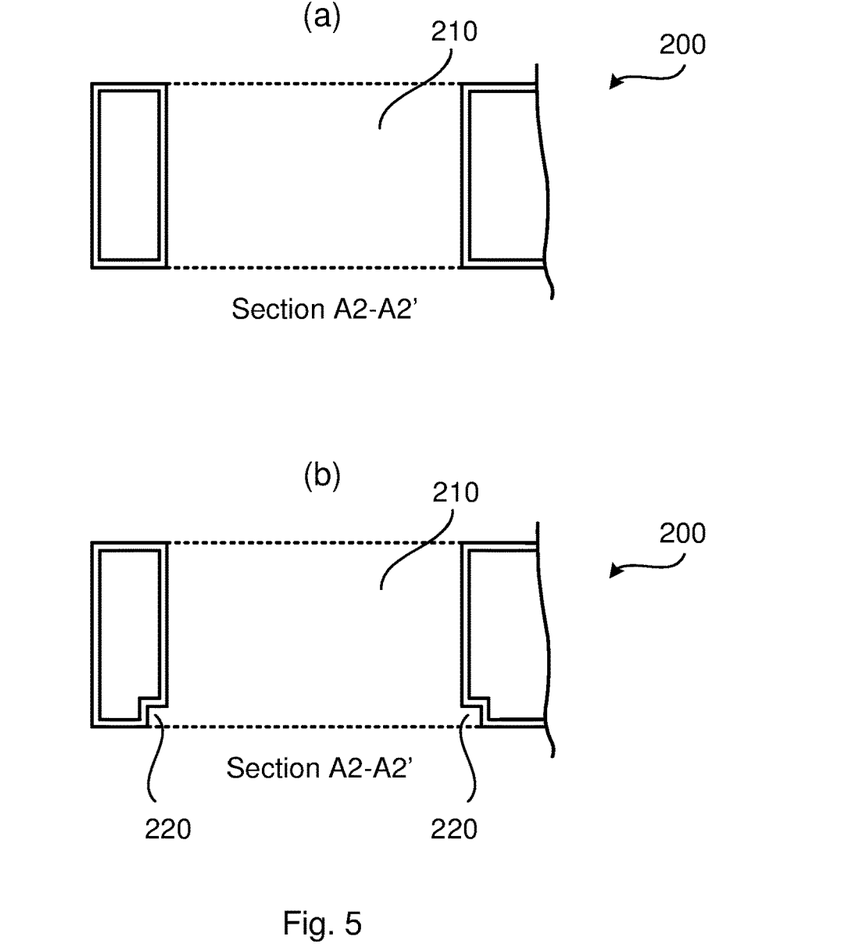

FIG. 5 illustrates top views of a section of the holding structure 200 of FIGS. 2 and 3 taken along the cut A2-A2'. In FIG. 5(a) the slot 210 has a rectangular shape, and in FIG. 5(b) the slot 210 further has a recess 220. The recess 220 is shaped so as to fit with a corresponding flange 340 of the passive module 300, as will be further disclosed below with reference to FIG. 7. Particularly, according to an embodiment the holding structure 200 exhibits a recess 220 to fit with a radially extending circumferential flange 340 of the passive module 300. The recess neighbours the slot 210. The recess 220 thereby enables the flange 340 of the passive module 300 to function as a lid, preventing the passive module 300 from being pushed all the way through the slot 210.

As will be further disclosed below with reference to FIG. 8, the holding structure 200 might exhibit at least one recess 230a, 230b to fit with a corresponding at least one peripheral outwardly and longitudinally extending flange 350a, 350b of the passive module 300. The at least one recess 230a, 230b neighbours the slot 210.

In some aspects the holding structure 200 has a cover 240 that covers the slot 210. Such a cover 240 would thus hide and/or protect the passive module 300 from the environment when the passive module 300 is placed in the slot 210. In FIG. 1 there thus are two slots, where one of the slots is covered by a cover 240. In some aspects the cover 240 is intended for the side of the slot 210 intended to face an indoor environment. Particularly, according to an embodiment the holding structure 200 further comprises, on a surface intended to face an indoor environment, a detachable cover 240. The detachable cover 240 is fitted to cover the slot 210 from the indoor environment. In some aspects the cover 240 is intended for the side of the slot 210 intended to face an outdoor environment. Particularly, according to an embodiment the holding structure 200 further comprises, on a surface intended to face an outdoor environment, a detachable cover 240. The detachable cover 240 is fitted to cover the slot 210 from the outdoor environment. In general terms, the cover 240 on a surface intended to face an outdoor environment and/or on a surface intended to face an indoor environment might be coated with a weather resistant coating. In general terms, the cover 240, whether intended to cover the slot 210 from the indoor environment or intended to cover the slot 210 from the outdoor environment should have properties that do not affect the propagation of radio waves.

Figure 6:
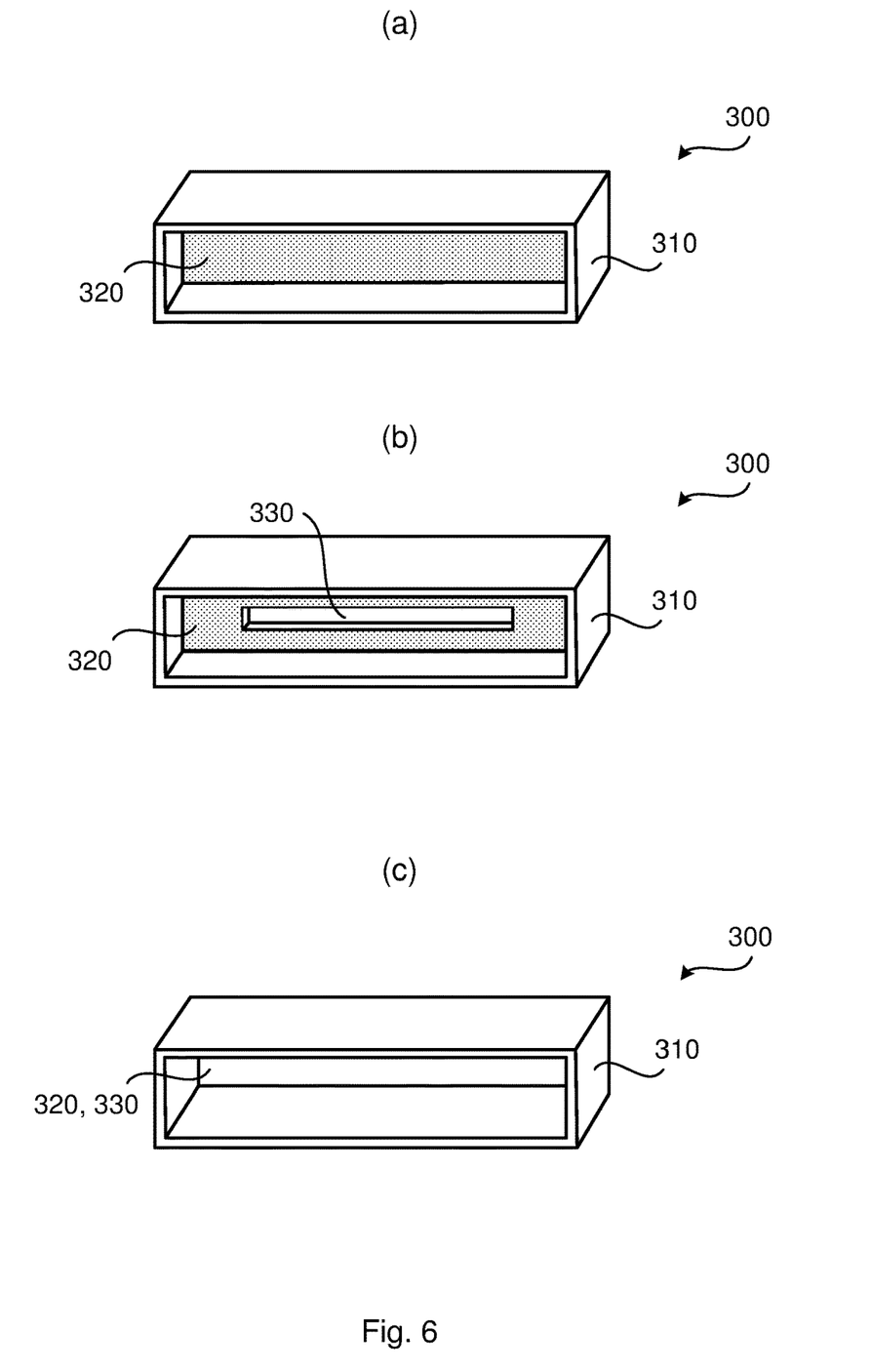
Figure 7:
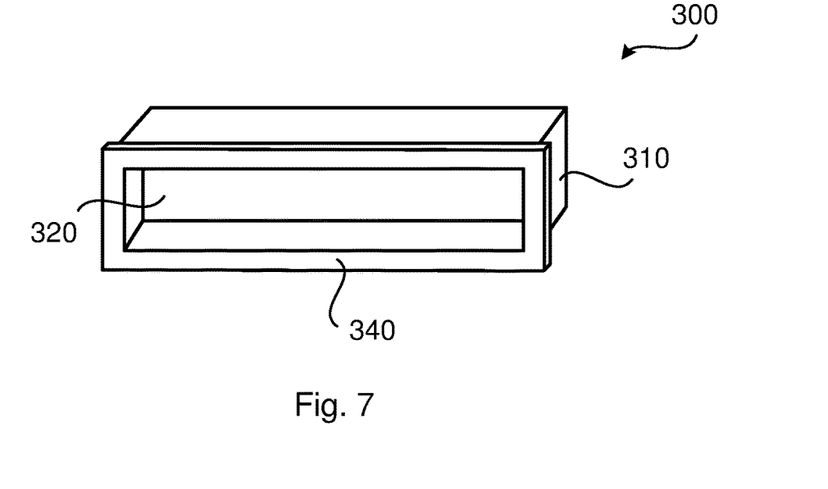
Figure 8:
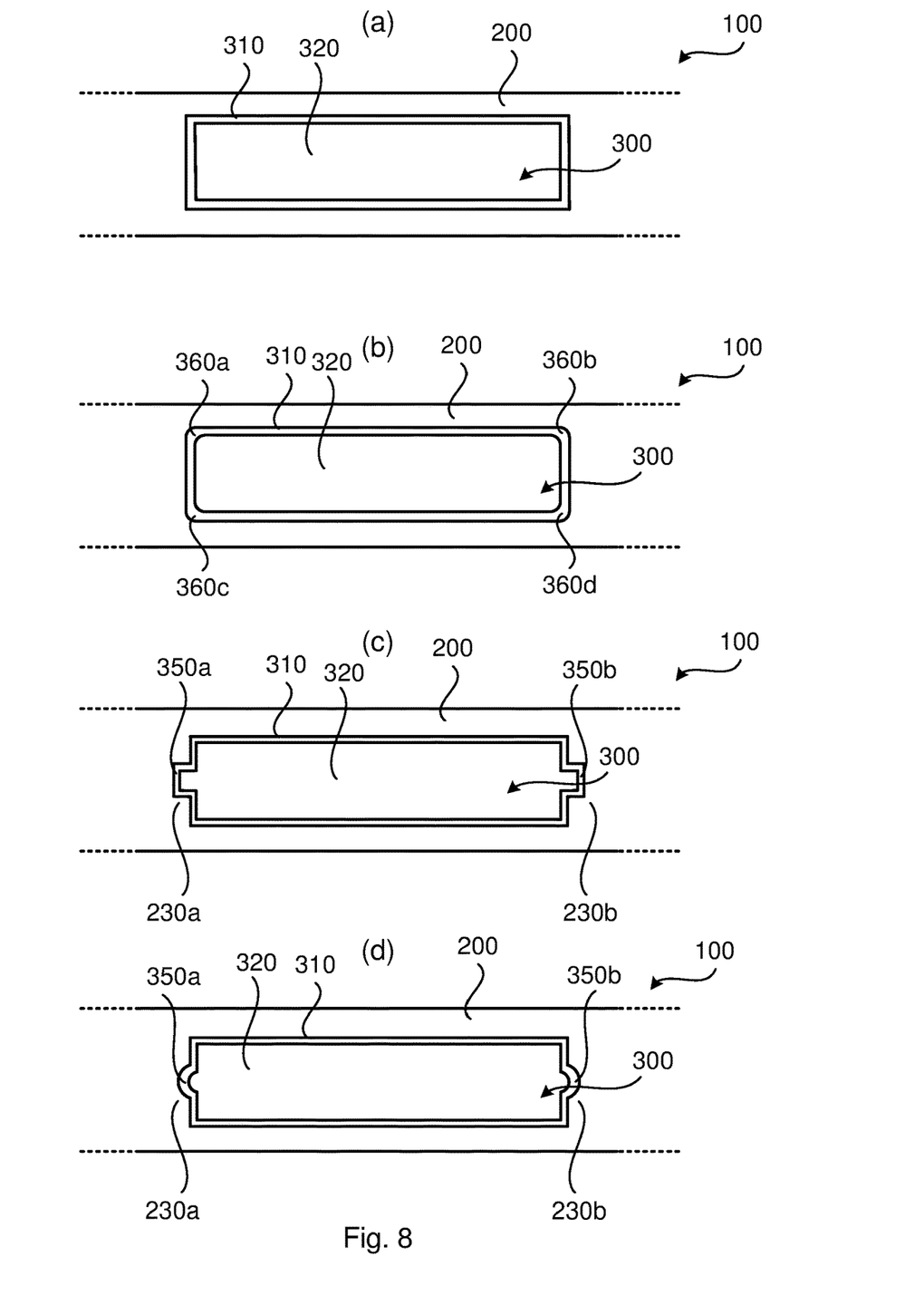

FIGS. 6, 7, 8 illustrate embodiments of a passive module 300 for the above disclosed holding structure 200. The passive module 300 comprises a support structure 310. The passive module 300 further comprises a radio transmission regulating structure 320. The radio transmission regulating structure 320 is supported by the support structure 310. The radio transmission regulating structure 320 has a radio transmission regulating characteristics.

Embodiments relating to further details of the passive module 300 will now be disclosed.

In some aspects the passive module 300 is intended for an outdoor to indoor radio transmission scenario. The radio transmission regulating structure 320 might then be an outdoor to indoor radio transmission structure and the radio transmission regulating characteristics might be an outdoor to indoor radio transmission characteristics. In some aspects the passive module 300 is intended for an indoor to outdoor radio transmission scenario. The radio transmission regulating structure 320 might then be an indoor to outdoor radio transmission structure and the radio transmission regulating characteristics might be an indoor to outdoor radio transmission characteristics. In some aspects the passive module 300 is intended for an indoor to indoor radio transmission scenario. The radio transmission regulating structure 320 might then be an indoor to indoor radio transmission structure and the radio transmission regulating characteristics might be an indoor to indoor radio transmission characteristics.

The passive module 300 is generally configured to be slotted into the slot 210 of the holding structure 200. In some aspects the passive module 300 is physically removable from the holding structure 200. This enables a quick and easy replacement of one passive module 300 with one type of radio transmission regulating characteristics with another passive module 300 with another type of radio transmission regulating characteristics. In this respect the passive module 300 is physically removable from the holding structure 200 without undue burden, for example without using any tools. Put in other ways, the passive module 300 is intended for intentional removal from the holding structure 200, for example without using any tools.

There may be different examples of support structures 310. In some aspects the support structure 310 might be regarded as a housing. For example, the support structure 310 might define a frame structure circumventing the radio transmission regulating structure 320. In some aspects the support structure 310 might be a metal, wood, or plastic profile. Particularly, according to an embodiment the support structure 310 comprises a top portion and a bottom portion and two side portions extending between the top portion and the bottom portion. The top portion, the bottom portion and the two side portions frame the radio transmission regulating structure 320.

There may be different examples of radio transmission regulating characteristics. In general terms, the radio transmission regulating characteristics relate to permeability of radio transmission from one side of the radio transmission regulating structure 320 to an opposite side of the radio transmission regulating structure 320. One side of the radio transmission regulating structure 320 might be arranged to face an indoor environment and the opposite side of the radio transmission regulating structure 320 might be arranged to face an outdoor environment. In some aspects the radio transmission regulating characteristics relate to outdoor-to-indoor radio transmission permeability. In some aspects the radio transmission regulating characteristics relate to indoor-to-outdoor radio transmission permeability. Alternatively, both sides of the radio transmission regulating structure 320 might be arranged to face an indoor environment. Thus, in some aspects the radio transmission regulating characteristics relate to indoor-to-indoor radio transmission permeability. Particularly, according to an embodiment the radio transmission regulating characteristics relate to radio transmission in a given wavelength interval or (equivalent) frequency interval.

As disclosed above, according to an embodiment the holding structure 200 is a window reveal, a window casing, a window frame, a door jamb, a door, a roof, or an A-, B-, C-, or D-pillar of a vehicle. Thus, the movable wing could be a window frame or a door. The passive module 300 could thereby be located in a window reveal, a window casing, a window frame, a door jamb, a door, a roof, or an A-, B-, C-, or D-pillar of a vehicle, enabling radio transmission through the window reveal, window casing, window frame, door jamb, door, roof, or A-, B-, C-, or D-pillar of a vehicle to be either blocked or allowed, depending on the radio transmission regulating characteristics of the radio transmission regulating structure 320. In some aspects the radio transmission regulating structure 320 is thus arranged to, according to the radio transmission regulating characteristics, either block or allow radio transmission from one side of the radio transmission regulating structure 320 to an opposite side of the radio transmission regulating structure 320. Particularly, according to an embodiment the radio transmission regulating characteristics defines whether to allow or to prevent radio transmission in the given wavelength (or frequency) interval.

FIG. 6 illustrates perspective views of a passive module 300 according to embodiments. FIGS. 6(a), 6(b), and 6(c) illustrate a passive module 300 with mutually different radio transmission regulating structures 320.

In the example of FIG. 6(a) the radio transmission regulating structure 320 defines a back wall of the passive 5 module 300. In the example of FIG. 6(b) the radio transmission regulating structure 320 exhibits a slot 330. In the example of FIG. 6(c) the radio transmission regulating structure 320 is defined by the slot 330 itself. Thus, according to an embodiment (as in FIG. 6(b)) the radio transmission regulating structure 320 exhibits a slot 330. The 10 slot 330 provides a passage in the radio transmission regulating structure 320 between a surface of the passive module 300 intended to face an outdoor environment and a surface of the passive module 300 intended to face an indoor environment. Alternatively, the slot 330 provides a passage in the radio transmission regulating structure 320 between a first surface of the 15 passive module 300 intended to face an outdoor environment and a second surface of the passive module 300 intended to face the indoor environment. Further, according to an embodiment (as in FIG. 6(c)) the radio transmission regulating structure 320 is defined by the slot 330 itself. Thus, depending of considered radio frequency of the radio transmission, the sizing of the slot 20 330 might enable specific radio frequency selective properties to be catered for.

There might be different ways to select the size of the slot 330. In general terms, the radio transmission regulating structure 320 has radio transmission regulating characteristics that should comply with what radio frequencies or wavelengths (of the radio transmission) that are considered. Particularly, according to an embodiment the slot 330 has a size which depends on the radio transmission regulating characteristics. In some aspects the slot 330 has a size which depends on the polarization of the radio transmission to be blocked or allowed through the slot 330. The slot 330 might thus have a size of that should comply with what wavelengths (of the radio transmission) that should be admitted or blocked.

In some aspects the slot 330 has a fixed size. One way to change the radio transmission regulating characteristics would then be to exchange a passive module 300 having a particular radio transmission regulating characteristics with another passive module 300 having another particular radio transmission regulating characteristics. In other aspects the slot 330 is resizable. Particularly, according to an embodiment the slot 330 is resizable. The slot 330 might be resizable by means of a slidable hatch cover or door, wherein the hatch cover or door is slidably arranged at the radio transmission regulating structure 320 so as to resize the slot 330.

The passive module 300 might be arranged so as to not affecting any thermal insulating properties of the holding structure 200, for example by the passive module 300 being packed with a material holding appropriate thermal properties and/or having a coating on at least one of its sides.

In some aspects the passive module 300 is packed with a material holding appropriate thermal properties so as to prevent thermal radiation from one side of the radio transmission regulating structure 320 to an opposite side of the radio transmission regulating structure 320. Particularly, according to an embodiment the passive module 300 is provided with a thermally insulating material. In some aspects the material is provided in the slot 330. Particularly, according to an embodiment the slot 330 is filled with the thermally insulating material. There could be different examples of thermally insulting materials. In general terms, the thermally insulting material should have properties that do not affect the propagation of radio waves. Examples of thermally insulting materials include, but are not limited to, polystyrene foam, typically as extruded polystyrene (XPS).

The surface of the passive module 300 intended to face an outdoor environment and/or an indoor environment might be required to have appropriate resistance to wind, climate, and/or general wear and tear. In some aspects the passive module 300 therefore has a coating on at least one of its sides that is intended to face an outdoor environment and/or an indoor environment. Particularly, according to an embodiment the passive module 300 on a surface intended to face an outdoor environment and/or on a surface intended to face an indoor environment is coated with a weather resistant coating. In general terms, the weather resistant coating should have properties that do not affect the propagation of radio waves. In some aspects the weather resistant coating does not need to be coated on a side where the passive module 300 is intended to be covered by the cover 240 when the passive module 300 is accommodated by the holding structure 200.

FIG. 7 is a perspective view of a passive module 300 according to an embodiment. The passive module 300 of FIG. 7 might have further properties and characteristics, such as exhibiting a slot, as disclosed above with reference to FIG. 6. The passive module 300 of FIG. 7 is provided with a flange 340. Particularly, according to an embodiment the support structure 310 comprises a radially extending circumferential flange 340. A passive module 300 as in the embodiment of FIG. 7 would fit the holding structure 200 according to the embodiment of FIG. 5(b).

FIG. 8 illustrates front views of a passive module 300 and a holding structure 200 according to embodiments. FIGS. 8(a), 8(b), 8(c), and 8(d) illustrate a passive module 300 and a holding structure 200 with different cross-sections.

In FIG. 8(a) the support structure 310 of the passive module 300 has squared corners and the slot 210 in which the passive module 300 is provided thus has a cross section with correspondingly squared corners. In FIG. 8(b) the support structure 310 of the passive module 300 has rounded corners 360a, 360b, 360c, 360d and the slot 210 in which the passive module 300 is provided thus has a cross section with correspondingly rounded corners. Particularly, according to an embodiment the support structure 310 has rounded corners 360a, 360b, 360c, 360d in its fittings with the holding structure 200.

In FIGS. 8(c) and 8(d) the support structure 310 of the passive module 300 is provided with flanges 350a, 350b and the slot 210 in which the passive module 300 is provided thus has a cross section with recesses 230a, 230b of the corresponding shape. Particularly, according to an embodiment the support structure 310 comprises at least one peripheral outwardly and longitudinally extending flange 350a, 350b for fitting the passive module 300 with the holding structure 200.

There could be different cross sections of the flanges 350a, 350b. In the example of FIG. 8(c) the flanges 350a, 350b have a rectangular cross section. Particularly, according to an embodiment the at least one flange 350a, 350b has a rectangular cross section. In the example of FIG. 8(d) the flanges 350a, 350b have a rounded cross section. Particularly, according to an embodiment the at least one flange 350a, 350b has a rounded cross section. In this respect, a support structure 310 with either squared or rounded corners might be combined with flanges 350a, 350b of any shape.

In some aspects, a holding structure 200 as herein disclosed and at least one passive module 300 as herein disclosed constitute a kit of parts 100. Hence, in some aspects there is provided a kit of parts 100 comprising at least one passive module 300 as herein disclosed and a holding structure 200 as herein disclosed. In some aspects the kit of parts 100 comprises passive modules 300 with different radio transmission regulating characteristics. Particularly, according to an embodiment the kit of parts 100 comprises at least two passive modules 300. The at least two passive modules 300 have mutually different radio transmission regulating characteristics. For example, the kit of parts 100 might comprise a holding structure 200, a passive module 300 as in FIG. 6(a), a passive module 300 as in FIG. 6(b), and a passive module 300 as in FIG. 6(c).

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A passive module for a holding structure adjacent or part of a movable wing, the passive module comprising:
   a support structure; and
   a radio transmission regulating structure, the radio transmission regulating structure being supported by the support structure and having a radio transmission regulating characteristics.

2. The passive module according to claim 1, wherein the support structure comprises a top portion and a bottom portion and two side portions extending between the top portion and the bottom portion, the top portion, bottom portion and two side portions framing the radio transmission regulating structure.

3. The passive module according to claim 1, wherein the radio transmission regulating characteristics relate to radio transmission in a given wavelength interval or frequency interval.

4. The passive module according to claim 3, wherein the radio transmission regulating characteristics defines whether to allow or to prevent radio transmission in the given wavelength interval.

5. The passive module according to claim 1, wherein the radio transmission regulating structure exhibits a slot, the slot providing a passage in the radio transmission regulating structure between a first surface of the passive module intended to face an outdoor environment and a second surface of the passive module intended to face the indoor environment.

6. The passive module according to claim 5, wherein the radio transmission regulating structure is defined by the slot itself.

7. The passive module according to claim 5, wherein the slot is resizable and/or has a size which depends on the radio transmission regulating characteristics.

8. The passive module according to claim 5, wherein the slot is filled with the thermally insulating material.

9. The passive module according to claim 1, wherein the passive module on a surface intended to face an outdoor environment and/or on a surface intended to face an indoor environment is coated with a weather resistant coating.

10. The passive module according to claim 1, wherein the support structure comprises a radially extending circumferential flange.

11. The passive module according to claim 1, wherein the support structure comprises at least one peripheral outwardly and longitudinally extending flange for fitting the passive module with the holding structure.

12. The passive module according to claim 11, wherein the at least one flange has one of: a rectangular cross section or a rounded cross section.

13. The passive module according to claim 1, wherein the support structure has rounded corners in its fittings with the holding structure.

14. A holding structure adjacent or part of a movable wing, the holding structure exhibiting a slot for receiving a passive module according to claim 1.

15. The holding structure according to claim 14, exhibiting a recess to fit with a radially extending circumferential flange of the passive module, the recess neighbouring the slot.

16. The holding structure according to claim 14, exhibiting at least one recess to fit with a corresponding at least one peripheral outwardly and longitudinally extending flange of the passive module, the at least one recess neighbouring the slot.

17. The holding structure according to claim 14, further comprising,
   on a surface intended to face an indoor environment, a detachable cover, the detachable cover being fitted to cover the slot from the indoor environment, and/or
   on a surface intended to face an outdoor environment, a detachable cover, the detachable cover being fitted to cover the slot from the outdoor environment.

18. The holding structure according to claim 14, wherein the holding structure is a window reveal, a window casing, a window frame, a door jamb, a door, a roof, or an A-, B-, C-, or D-pillar of a vehicle.

19. A kit of parts comprising at least one passive module according to claim 1 and a holding structure according to claim 14.

20. The kit of parts according to claim 19, comprising at least two passive modules, wherein the at least two passive modules have mutually different radio transmission regulating characteristics.

* * * * *